(12) United States Patent
Jenter

(10) Patent No.: US 11,607,822 B2
(45) Date of Patent: Mar. 21, 2023

(54) CUTTING MACHINE WITH BLADE DEPTH ADJUSTMENT

(71) Applicant: Krug & Priester GmbH & Co. KG, Balingen (DE)

(72) Inventor: Holger Jenter, Balingen (DE)

(73) Assignee: Krug & Priester GmbH & Co. KG, Balingen (DE)

( * ) Notice: Subject to any disclaimer, the term of this patent is extended or adjusted under 35 U.S.C. 154(b) by 0 days.

(21) Appl. No.: 17/654,361

(22) Filed: Mar. 10, 2022

(65) Prior Publication Data

US 2022/0297331 A1 Sep. 22, 2022

(30) Foreign Application Priority Data

Mar. 17, 2021 (EP) .................................. 21 163 033

(51) Int. Cl.
*B26D 5/02* (2006.01)
*B26D 7/26* (2006.01)
*B23D 35/00* (2006.01)

(52) U.S. Cl.
CPC .............. *B26D 5/02* (2013.01); *B23D 35/005* (2013.01); *B26D 7/2628* (2013.01)

(58) Field of Classification Search
CPC . B30B 15/24; B30B 15/0029; B30B 15/0035; B23D 35/005; B26D 7/26; B26D 7/2628
USPC .......................... 83/699.31; 100/258 R, 258 A
See application file for complete search history.

(56) References Cited

U.S. PATENT DOCUMENTS

| | | | | |
|---|---|---|---|---|
| 1,569,569 A | * | 1/1926 | Pels | B23D 35/005 83/636 |
| 3,605,608 A | * | 9/1971 | Dagley | B30B 1/08 100/271 |
| 3,763,690 A | * | 10/1973 | Kirincic | B23D 33/00 100/258 A |
| 3,805,694 A | * | 4/1974 | Jureit | B27F 7/155 100/271 |
| 4,070,896 A | * | 1/1978 | Heitner | B21D 5/02 72/389.5 |
| 5,784,940 A | * | 7/1998 | Gross | B26D 7/2628 83/699.41 |

(Continued)

FOREIGN PATENT DOCUMENTS

| | | |
|---|---|---|
| CN | 109 834 757 A | 6/2019 |
| DE | 940 401 C | 3/1956 |
| DE | 2934529 A1 * | 3/1981 |

(Continued)

*Primary Examiner* — Kenneth E Peterson
(74) *Attorney, Agent, or Firm* — Orbit IP

(57) ABSTRACT

A cutting machine has a cutting support for material to be cut, with a vertically movable blade bar which bears a blade for cutting the cut material located thereon. A cutting drive is for vertically moving the blade bar. A blade depth adjustment is for vertically adjusting the blade bar relative to a vertically movable drive element of the cutting drive. The blade depth adjustment includes a deflection lever which is pivotably mounted about a horizontal axis on the blade bar. The drive element can be articulated thereon at a first radial distance to the horizontal axis. An adjusting mechanism may act on the deflection lever at a second radial distance to the horizontal axis, for rotating and fixing the deflection lever.

15 Claims, 2 Drawing Sheets

(56) References Cited

U.S. PATENT DOCUMENTS 6,055,903 A * 5/2000 Eigenmann ............... B30B 1/06
100/285
7,162,908 B2 * 1/2007 Manini .................... B21D 5/02
100/282

FOREIGN PATENT DOCUMENTS

| GB | 689 441 A | | 3/1953 | |
|----|-----------|---|--------|---|
| JP | 62192298 A | * | 8/1987 | |
| WO | WO2010/084579 | * | 7/2010 | ............... B26D 1/08 |

* cited by examiner

CUTTING MACHINE WITH BLADE DEPTH ADJUSTMENT

CROSS-REFERENCE TO RELATED APPLICATIONS

This application claims priority to European Application No. 21 163 033.0 filed Mar. 17, 2021, the entire contents of which are hereby incorporated in full by this reference.

DESCRIPTION

Field of the Invention

The invention relates to a cutting machine with a cutting support for material to be cut, with a vertically movable blade bar which bears a blade for cutting the cut material located thereon, with a cutting drive for vertically moving the blade bar and with a blade depth adjustment for vertically adjusting the blade bar relative to a vertically movable drive element of the cutting drive.

Background of the Invention

Cutting machines generally have a mechanical structure which moves a blade manually by the action of force by the operator or electrically driven from top to bottom through a material to be cut, such as for example a paper stack. A cutting counter support in the form of a cutting strip is required as a counterpart to the blade. This cutting strip is generally inserted flush with the table surface of the cutting machine on which the material to be cut is located. Since the blade is also designed to separate the lowermost layer of a cut material stack, the blade has to penetrate minimally into the cutting strip. The cutting strip is generally produced from plastics; this provides, on the one hand, sufficient strength as the cutting counter support and, on the other hand, permits the blade to be able to penetrate minimally into the cutting strip without being damaged. The cutting strip and the blade are subjected to a certain degree of wear during the cutting process so that both have to be replaced at regular intervals in order to ensure their function.

On the one hand, it has to be ensured that the lowermost layer of a cut material stack is also cut through, but on the other hand the blade and the cutting strip are designed to be protected in the best possible manner in order to achieve service lives which are as long as possible. This reduces the operating costs and is also desirable for reasons of saving resources. It is thus very important for the blade to penetrate into the cutting strip only just as far as is absolutely necessary. If the blade and/or the cutting strip are worn, they have to be replaced.

To this end, screws are screwed into the blade through the vertically movable blade bar of the cutting machine. These screws are guided in a vertically-displaceable manner in slots (elongated holes) in the blade bar. The fastening takes place at the lower reversal point of the blade movement, wherein the slots permit an approximate adaptation of the position of the blade to the cutting strip before the screws are tightened. Thus whilst during the cutting cycle the blade is in its lowermost movement position on the cutting strip, it does not penetrate therein.

The fine adjustment of the blade which is thus required relative to the cutting strip is undertaken with a so-called blade depth adjustment. This blade depth adjustment has to be able to be carried out with fine-tuning in order to permit the operator to adjust the optimal penetration depth of the blade in the cutting strip in a simple manner. In order to ensure that, on the one hand, the lowermost position of a cut material stack is reliably cut but that, on the other hand, the blade and the cutting strip are protected to a maximum extent, the adjustment has to be carried out very accurately. Since both the blade and the cutting strip are successively worn during their period of use, they have to be occasionally re-adjusted until they are replaced.

Solutions available today to the operator are often difficult to handle since the adjusting elements of the blade depth adjustment are not located on the front face, the main working region of the cutting machine, but for example at the side. This is a drawback, in particular, when the accessibility is limited at this point due to the point of installation of the cutting machine. Machines are also available on the market in which the adjustment is located in the machine interior behind a housing cover. This housing cover has to be removed for the adjustment. In addition to the additional effort, therefore, often the accessibility to an adjusting element of the blade depth adjustment is also limited. Although other embodiments are located in the main working region of the machine, the adjustment is not implemented by a central adjustment option but a plurality of adjusting elements have to be actuated or adjusted relative to one another in order to achieve the desired effect. Generally tools are required for the adjustment process. If these tools are required for no other function of the machine, this involves additional costs for the machine user, in particular when these tools are special tools. In the case of wear or loss, these tools may then be generally purchased only as a replacement part from the machine manufacturer.

SUMMARY OF THE INVENTION

Accordingly, it is the object of the present invention to develop the blade depth adjustment in a cutting machine of the type mentioned in the introduction such that an operator may implement the blade depth in a manner which is as rapid, simple, fine-tuned and ergonomically advantageous as possible.

This object is achieved according to the invention in that the blade depth adjustment has a deflection lever which is pivotably mounted about a horizontal axis on the blade bar, the drive element being articulated thereon at a first radial distance, as well as an adjusting mechanism acting on the deflection lever at a second radial distance to the horizontal axis, for rotating and fixing the deflection lever.

According to the invention, the shortening or lengthening of the vertical distance between the drive element (for example the drive connecting rod) and blade bar is carried out by means of a rotatable deflection lever, the vertical position of the drive element relative to the blade bar being able to be changed by the rotation thereof.

Preferably, the small adjustment path required on the blade should be transferred into a larger adjustment path on the adjusting element. To this end, for example, the second radial distance may be greater than the first radial distance, in particular at least double the size of the first radial distance. To this end, the point of action of the drive element on the deflection lever may also be arranged horizontally offset relative to the horizontal axis, and on the deflection lever in an angular range relative to the horizontal plane defined by the horizontal axis of the deflection lever, of +/−60° about the horizontal axis.

In a particularly advantageous embodiment of the invention, the adjusting mechanism has a transmission lever which is articulated at one end on the deflection lever and at the other end is supported on the blade bar. The transmission lever permits the displacement of the adjusting mechanism in the directly accessible main working region of the cutting machine. In this case, advantageously the transmission lever may be articulated at the other end eccentrically on an adjusting element which is rotatably mounted on the blade bar.

Preferably, the adjusting element may have a tool receiver with a non-circular receiving contour in order to rotate the adjusting element by means of a tool, in particular with single-handed operation. This tool may preferably also be used when changing the blade. Further preferably, the adjusting element has a toothed ring which is arranged coaxially to the axis of rotation thereof and the blade bar has at least one tooth, or vice versa, wherein the toothed ring and the at least one tooth are in engagement with one another in order to fix the adjusting element in the rotational position thereof. For rotating the adjusting element, the adjusting element preferably may be axially displaceable between a first position in which the toothed ring and the at least one tooth are in engagement with one another, and a second position in which the toothed ring and the at least one tooth are not in engagement with one another and the adjusting element may be rotated. Thus, on the one hand, the torque which is introduced via the transmission lever is received and, on the other hand, the operator may undertake the adjustment in a smooth manner.

Preferably, a spring-loaded latch is arranged on the blade bar, said latch in each case being latched progressively from one tooth gap to the next tooth gap of the toothed ring, when rotating the adjusting element, in order to provide the operator with a direct visual and/or haptic feedback during the adjustment. Alternatively or additionally, the adjusting element may have a scale following the rotational direction thereof and the blade bar has a marking cooperating with the scale, or vice versa, in order to provide the operator with an orientation aid for the adjustment.

Further advantages of the invention emerge from the description and the drawing. The aforementioned features described in more detail below according to the invention in each case may also be used individually per se or in a plurality of combinations thereof. The embodiments shown and described are not to be understood as a definitive list but rather have an exemplary nature for explaining the invention.

BRIEF DESCRIPTION OF THE DRAWINGS

The invention is shown in the drawings and is described in more detail with reference to an exemplary embodiment. In the drawings.

DETAILED DESCRIPTION OF THE PREFERRED EMBODIMENTS

Figure 1:
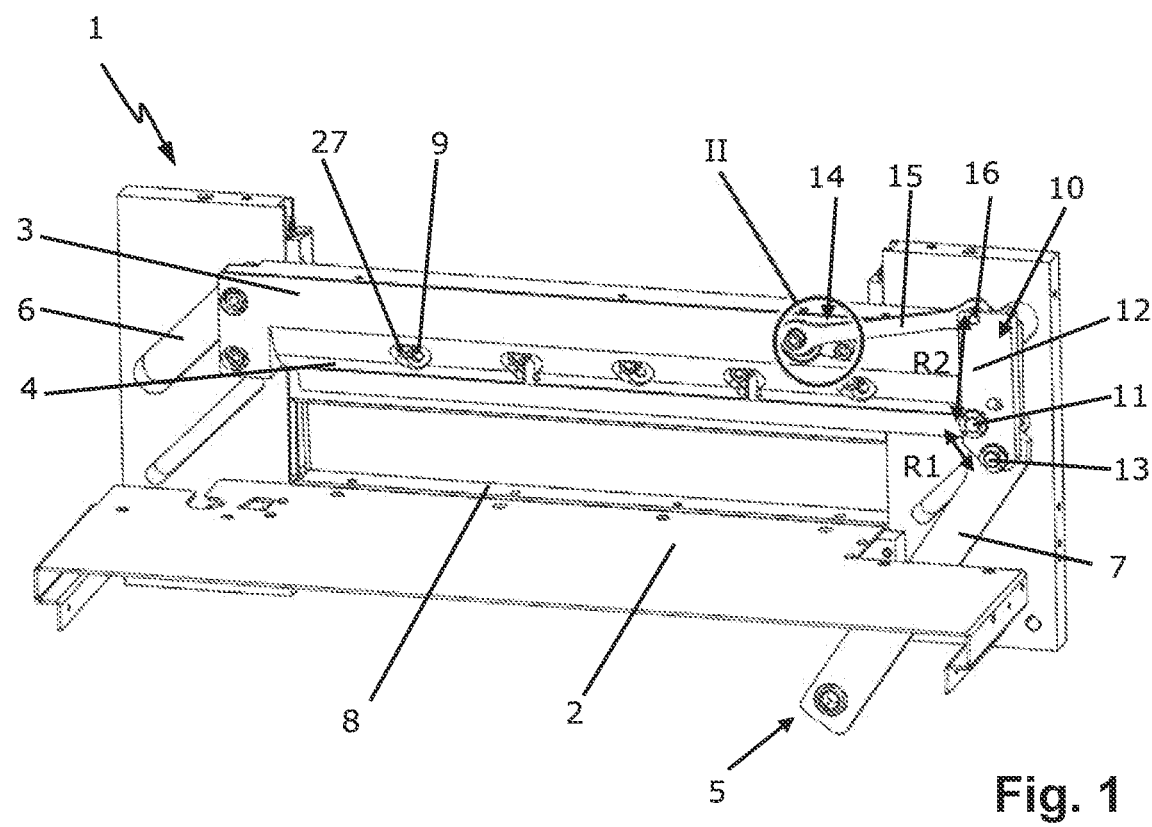
FIG. 1 shows the front view of the cutting machine according to the invention with a blade depth adjustment.

The cutting machine 1 shown in FIG. 1 comprises a cutting support 2 for the material to be cut, a vertically movable blade bar 3 which bears a blade 4 for cutting the cut material located thereon, and a cutting drive 5 for vertically moving the blade bar 3. The blade bar 3 is mounted in a vertically movable manner in a guide slot 6 running obliquely in this case. The cutting drive 5 is manually actuated or electrically driven and is motion-coupled to the blade bar 3 via a vertically movable drive connecting rod 7, the lower reversal point thereof defining the lower reversal point of the blade movement.

A cutting strip 8 which is generally inserted flush in the cutting support 2 serves as a counterpart for the blade cutter. Since the blade 4 is also designed to separate the lowermost layer of a cut material stack, the blade 4 has to penetrate minimally into the cutting strip 8. The cutting strip 8 is generally produced from plastics; this provides, on the one hand, sufficient strength as the cutting counter support and, on the other hand, permits the blade 4 to penetrate minimally into the cutting strip 8, without being damaged itself. The cutting strip 8 and the blade 4 are subjected to a certain degree of wear during the cutting process, such that from time to time they both have to be replaced in order to fulfil their function optimally. Thus, on the one hand, it has to be ensured that even the lowermost layer is cut through and, on the other hand, the blade 4 and the cutting strip 8 are protected in the best possible manner in order to achieve service lives which are as long as possible. Thus it is very important for the blade 4 to penetrate into the cutting strip 8 only just as far as is absolutely necessary.

If the blade 4 and the/or the cutting strip 8 are worn, they have to be replaced. To this end, screws 9 are screwed into the blade 4 through the blade bar 3, said screws being guided in a vertically adjustable manner in slots (elongated holes) 27 in the blade bar 3. The fastening takes place at the lower reversal point of the blade movement, i.e. at the lower reversal point of the drive connecting rod 7, wherein the slots 27 permit an approximate adaptation of the position of the blade to the cutting strip 8 before the screws 9 are tightened. Thus whilst during the cutting cycle the blade 4 is located in its lowermost movement position on the cutting strip 8, it does not penetrate therein.

The required fine adjustment of the blade edge relative to the cutting strip 8, i.e. the vertical adjustment of the blade bar 3 relative to the lower reversal point of the drive connecting rod 7, is undertaken with a blade depth adjustment 10. This blade depth adjustment 10 comprises a deflection lever 12 which is pivotably mounted on the blade bar 3 about a horizontal axis in the form of a horizontal bearing pin 11, on which the drive connecting rod 7 is articulated at a radial distance R1 to the bearing pin 11 by means of a connecting rod pin 13, as well as an adjusting mechanism 14 acting on the deflection lever 12 at a radial distance R2 relative to the bearing pin 11 for rotating and fixing the deflection lever 12. Preferably, the radial distance R2 as shown in FIG. 1 is greater than the radial distance R1. The connecting rod pin 13 is arranged on the deflection lever 12 both horizontally offset relative to the bearing pin 11 and in an angular range, relative to the horizontal plane defined by the bearing pin 11, of ca.+/−60° about the bearing pin 11.

Figure 2:
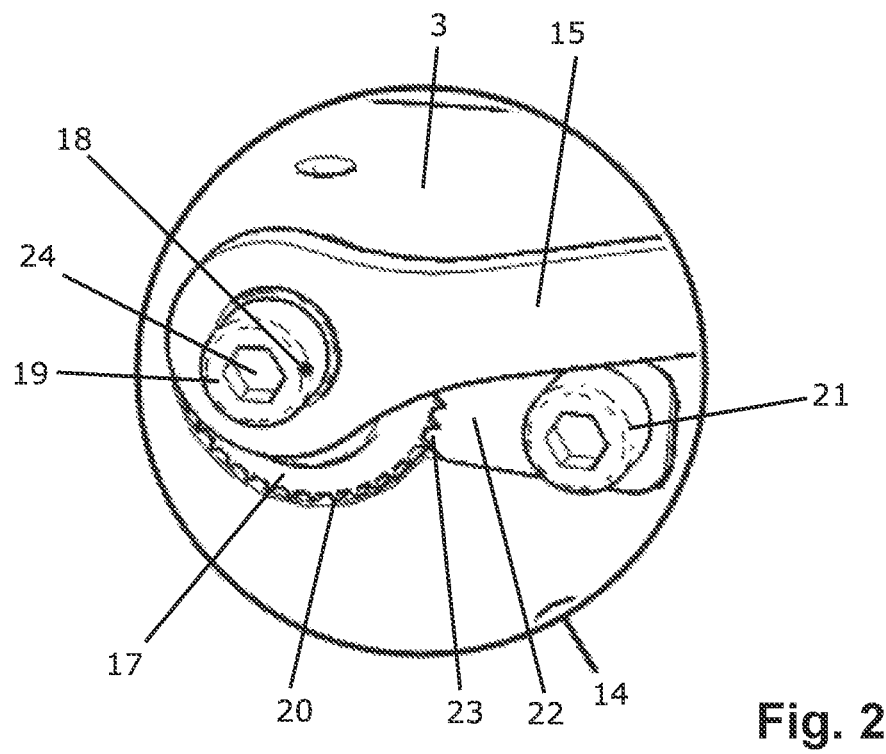
FIG. 2 shows an adjusting mechanism of the blade depth adjustment corresponding to II in FIG. 1.

The adjusting mechanism 14 has a transmission lever 15 which is articulated at one end by means of a lever pin 16 on the deflection lever 12 and, as shown in FIG. 2, is rotatably mounted at the other end eccentrically on an adjusting element 17 which in turn at 18 is rotatably mounted on the blade bar 3. To this end, a bearing pin 19 is eccentrically fastened to the adjusting element 17, about which the transmission lever 15 is rotatably mounted. The adjusting element 17 also has an (outer) toothed ring 20 arranged coaxially to the axis of rotation 18 thereof. By means of a screw 21 a fixing element 22 with a plurality of teeth 23 is screwed onto the blade bar 3, said teeth being engaged with the toothed ring 20 and thus fixing the adjusting element 17 in the rotational position thereof. The bearing pin 19 has a tool receiver 24 with a non-circular, in this case hexagonal, receiving contour.

Figure 3A:
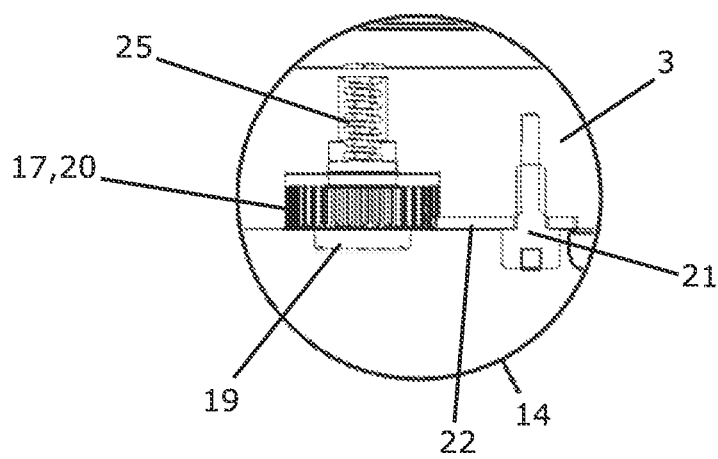
FIGS. 3a, 3b show views from above of the adjusting mechanism, wherein an adjusting element of the adjusting mechanism in FIG. 3a is shown in a rotationally blocked state and in FIG. 3b in a rotationally non-blocked state.
Figure 3B:
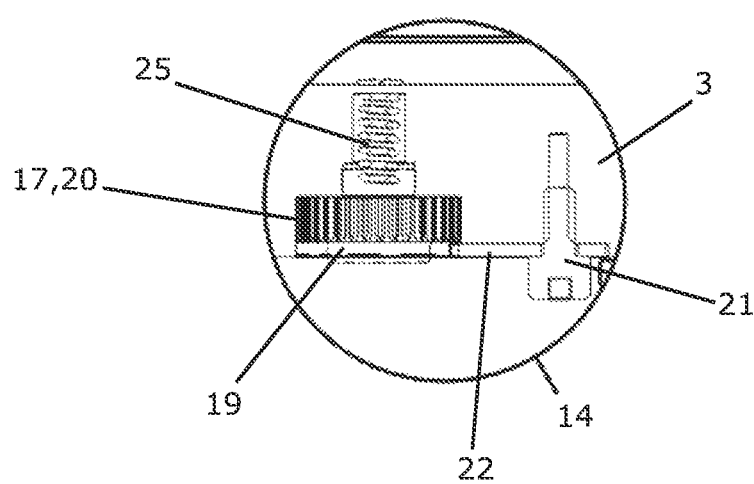
Figure 4:
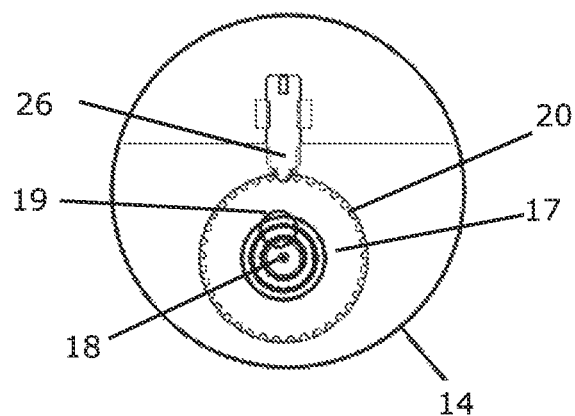
FIG. 4 shows a detailed view of a latching mechanism for the adjusting element.

The adjusting element 17 is axially displaceable between a first position (FIG. 3a) in which the toothed ring 20 and the teeth 23 are in engagement with one another, and a second position (FIG. 3b) in which the teeth 23 and the toothed ring 20 are not in engagement with one another and thus the adjusting element 17 may be rotated. The adjusting element 17 is displaceable from the first position into the second position counter the action of a restoring spring 25. As shown in FIG. 4, optionally a spring-loaded latch 26 is arranged on the blade bar 3, said latch in each case being latched progressively from one tooth gap to the next tooth gap of the toothed ring 20, when rotating the adjusting element 17.

The functional sequence of the cutting process is as follows:

The drive connecting rod 7 is connected, on the one hand, to the components of the cutting drive 5, not shown, such as for example a drive crank drive. On the other hand, the drive connecting rod 7 is coupled via the connecting rod pin 13 to the deflection lever 12. If the cutting process is activated by the operator, the drive connecting rod 7 is pulled downwardly from its upper resting position into its lower reverse position. Since the cutting bar 3 is connected in turn via the bearing pin 11 to the deflection lever 12, the blade 4 follows this downward movement along the guide slot 6 in which the blade bar 3 is mounted. The cut material placed below the blade 4 is cut through by the blade 4, wherein the cutting strip 8 serves as the cutting counter support. After the step of cutting the material to be cut has taken place, the entire subassembly travels back into its upper end position.

The functional sequence of the blade depth adjustment is as follows:

After the blade 4 and/or the cutting strip 8 have been changed, the lower reversal point of the blade 4 generally has to be corrected in order to ensure that the blade 4 penetrates sufficiently far into the cutting strip 8 that even the lowermost layer of a cut material stack is still cut through. The cutting drive 5 which is connected to the drive connecting rod 7 always performs exactly the same lifting movement relative to the movement path. When changing the blade 4, this blade is fastened to the blade bar 3 at the lower reversal point bearing against the blade strip 8. To this end, the long holes 27 for the screws 9 are located in the blade bar 3. So that the blade 4 minimally penetrates the cutting strip 8, the distance between the drive connecting rod 7 and the blade fastening has to be minimally extended. Since here it is a case of only a few tenths of a millimetre, this is only able to be achieved in an unsatisfactory manner by obvious operating principles, such as for example a drive connecting rod 7 which may be adjusted in terms of length by means of a threaded spindle. Depending on the pitch of the threaded spindle, even with a small adjustment of the threaded spindle a relatively large change to the lower reversal point of the blade 4 is produced. A relatively large adjustment range for the operator is designed to bring about only a small displacement of the reversal point of the blade 4. This results in the possibility for a fine adjustment.

In order to achieve the desired effect, the drive connecting rod 7 is fastened in an articulated manner to the deflection lever 12 which in turn is rotatably connected via a bearing pin 11 to the blade bar 4. The arrangement is designed such that a rotation of the deflection lever 12 about the bearing pin 11 brings about a positional change of the connecting rod pin 13. The position of the connecting rod pin 13 and thus the point of action of the drive connecting rod 7 determine the upper and lower end position of the blade bar 4 and thus of the blade 4 during the cutting cycle.

If the lever pin 16 is significantly further away from the bearing pin 11 than the connecting rod pin 13 (R2>>R1), via the relative distances when pivoting the deflection lever 12 about the bearing pin 11 with a relatively large positional change of the lever pin 16 it leads only to a relatively small positional change of the connecting rod pin 13. Moreover, the angular positions of the lever pin 16 and the connecting rod pin 13 on their partial circles around the bearing pin 11 determine how much a positional change on the lever pin 16 via the deflection lever 12 has an effect on the change of the lower reversal point of the blade 4. If the connecting rod pin 13 in its initial position on a partial circle around the bearing pin 11 is arranged perpendicular below the bearing pin 11, a rotation of the deflection lever 12 by a few angular degrees leads to virtually no change at the lower and upper reversal point of the blade 4, since the vertical distance between the drive connecting rod 7 and the blade 4 is only minimally changed. If the connecting rod pin 13 is arranged, however, on the same partial circle in its initial position horizontally to the bearing pin 11, a rotation of the deflection lever 12 by a few angular degrees leads to a substantially greater change at the lower and upper reversal point of the blade 4, since the vertical distance between the drive connecting rod 7 and the blade 4 changes more sharply ("sine curve effect").

This means that by changing the distances and angular arrangements of the pins 11, 13, 16 to one another the adjustment sensitivity may be changed within a large range. Thus it is possible to implement the desired effect that a possibility for fine adjustment of the lower reversal point of the blade 4 is provided to the operator via a transmission ratio.

In order to permit the operator to adjust the lower blade reversal point at an ergonomically optimal position in the working region thereof, the deflection lever 12 is moved via the transmission lever 15. This transmission lever 15, mounted in an articulated manner, acts on the lever pin 16 of the deflection lever 12. The adjustment mechanism 14 acts at the other end of the transmission lever 15, said adjustment mechanism rotating and fixing the deflection lever 12 for the blade depth adjustment. In order to implement the desired deflection of the transmission lever 15 and thus the deflection lever 12, this transmission lever is eccentrically fastened in a rotatable manner to the centrally mounted adjusting element 17. If the adjusting element 17 is rotated about its central axis, the eccentric fastening of the transmission lever 15 to the adjusting element 17 produces the desired translatory movement of the transmission lever 15 which moves the deflection lever 12 via the lever pin 16.

Often large cutting forces, which the cutting drive 5 has to provide, are required when cutting the cut material. These forces act in the entire drive train. Since the forces act via the drive connecting rod 7 on the deflection lever 12, a torque, which acts via the lever pin 16 on the transmission lever 15, is produced by the offset of the connecting rod pin 13 relative to the bearing pin 11. The transmission lever 15 in turn transmits thereby a translatory force which is converted in turn into a torque by the eccentric fastening of the transmission lever 15 to the adjusting element 17. This torque causes the adjusting element 17 to be set into a rotational movement. The adjusting element 17 is thus designed, on the one hand, to be able to be rotated easily by the operator for adjusting the blade depth and, on the other hand, the adjusting element 17 is not able to be adjusted when cutting the cut material. In order to be able to represent both functions, the adjusting element 17 has the toothed ring 20 in which the teeth 23 of the fixing element 22 engage. The adjusting element 17 is thus impeded in its rotational movement and may not be self-actingly adjusted during the cutting process.

If the operator wishes to adjust the adjusting element 17 for adjusting the blade depth, a tool which is kept in the vicinity of the machine is used to this end. This tool fits positively in the tool receiver 24 of the bearing pin 19. If the operator now pushes with the tool against the adjusting element 17, the adjusting element 17 is displaced from its rotationally blocked first position against the action of the restoring spring 25 into the rotationally non-blocked second position. The adjusting element 17 may now be rotated by the operator for the blade depth adjustment with the above-described effects. After the adjustment has been carried out, the operator pulls the tool away and the adjusting element 17 is moved by the restoring spring 25 back into its first position in which it engages again in the teeth 23 and thus is blocked in its new rotational position. The blade depth adjustment, i.e. the pushing-in and rotating of the adjusting element 17 by means of the tool, is thus possible with single-handed operation. Advantageously, the screws 9 may also be released or tightened by the same tool.

The latch 26 assists the operator specifically in order to adjust or relocate a rotational position of the adjusting element 17. The latch 26 enables the adjusting element 17 when rotated to be latched into predetermined angular positions so that the operator, for example, may "feel their way" from one latching position to the next in order to find the optimal adjustment. Such an adjusting element latching mechanism also provides the machine manufacturer with the option to be able to describe the adjusting process more clearly to the operator, for example in the instruction manual, by predetermining how many latching points the adjusting element 17 is designed to be rotated by as a basic adjustment. As an orientation aid for the adjustment, alternatively the adjusting element 17 may also be provided with a scale following the rotational direction thereof and the blade bar 3 may be provided with a marking on which the respective scale value may be read.

What is claimed is:

1. A cutting machine comprising:
   a cutting support for material to be cut;
   a vertically movable blade bar which bears a blade for cutting the cut material located on the cutting support;
   a cutting drive for vertically moving the blade bar; and
   a blade depth adjustment for vertically adjusting the blade bar relative to a vertically movable drive element of the cutting drive;
   wherein the blade depth adjustment comprises a deflection lever which is pivotably mounted about a horizontal axis on the blade bar, the drive element being articulated on the deflection lever at a first radial distance to the horizontal axis, as well as an adjusting mechanism acting on the deflection lever at a second radial distance to the horizontal axis, for rotating and fixing the deflection lever;
   wherein the adjusting mechanism comprises a transmission lever which is articulated at one end on the deflection lever and at the other end is supported on the blade bar.

2. The cutting machine according to claim 1, wherein the second radial distance is greater than the first radial distance.

3. The cutting machine according to claim 2, wherein the point of action of the drive element on the deflection lever is arranged horizontally offset relative to the horizontal axis.

4. The cutting machine according to claim 1, wherein a point of action of the drive element on the deflection lever is arranged horizontally offset relative to the horizontal axis.

5. The cutting machine according to claim 4, wherein the point of action of the drive element on the deflection lever is arranged in an angular range relative to the horizontal plane defined by the horizontal axis of the deflection lever, of +/−60° about the horizontal axis.

6. The cutting machine according to claim 1, wherein the transmission lever is articulated at the other end eccentrically on an adjusting element which is rotatably mounted on the blade bar.

7. The cutting machine according to claim 6, wherein the adjusting element has a tool receiver with a non-circular receiving contour.

8. The cutting machine according to claim 7, wherein the adjusting element has a toothed ring arranged coaxially to the axis of rotation of the adjusting element, and the blade bar has at least one tooth, wherein the toothed ring and the at least one tooth are in engagement with one another in order to fix the adjusting element in a rotational position.

9. The cutting machine according to claim 6, wherein the adjusting element has a toothed ring arranged coaxially to the axis of rotation of the adjusting element, and the blade bar has at least one tooth, wherein the toothed ring and the at least one tooth are in engagement with one another in order to fix the adjusting element in a rotational position.

10. The cutting machine according to claim 9, wherein the adjusting element is axially displaceable between a first position in which the tooted ring and the at least one tooth are in engagement with one another, and a second position in which the toothed ring and the at least one tooth are not in engagement with one another and the adjusting element may be rotated.

11. The cutting machine according to claim 10, wherein a spring-loaded latch is arranged on the blade bar, said latch in each case being latched progressively from one tooth gap to the next tooth gap of the toothed ring, when rotating the adjusting element.

12. The cutting machine according to claim 10, wherein the adjusting element is displaceable from the first position into the second position counter to the action of a restoring spring.

13. The cutting machine according to claim 12, wherein a spring-loaded latch is arranged on the blade bar, said latch in each case being latched progressively from one tooth gap to the next tooth gap of the toothed ring, when rotating the adjusting element.

14. The cutting machine according to claim 9, wherein a spring-loaded latch is arranged on the blade bar, said latch in each case being latched progressively from one tooth gap to the next tooth gap of the toothed ring, when rotating the adjusting element.

15. The cutting machine according to claim 1, wherein the second radial distance is at least double the size of the first radial distance.

* * * * *